(12) United States Patent
Andraka

(10) Patent No.: US 8,674,280 B1
(45) Date of Patent: Mar. 18, 2014

(54) CONCENTRATION SOLAR POWER OPTIMIZATION SYSTEM AND METHOD OF USING SAME

(75) Inventor: Charles E. Andraka, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 908 days.

(21) Appl. No.: 12/838,551

(22) Filed: Jul. 19, 2010

(51) Int. Cl.
*G01J 1/20* (2006.01)

(52) U.S. Cl.
USPC ............................ 250/203.4; 126/573

(58) Field of Classification Search
USPC ................. 126/571–573; 250/203.4
See application file for complete search history.

(56) References Cited

U.S. PATENT DOCUMENTS

| | | | |
|---|---|---|---|
| 4,564,275 A * | 1/1986 | Stone | 353/3 |
| 5,493,391 A | 2/1996 | Neal et al. | |
| 5,905,571 A | 5/1999 | Butler et al. | |
| 5,939,716 A | 8/1999 | Neal | |
| 5,982,481 A * | 11/1999 | Stone et al. | 356/152.2 |
| 6,487,859 B2 | 12/2002 | Mehos et al. | |
| 6,504,943 B1 | 1/2003 | Sweatt et al. | |
| 6,678,048 B1 | 1/2004 | Rienstra et al. | |
| 6,739,136 B2 | 5/2004 | Mechos et al. | |
| 6,768,256 B1 | 7/2004 | Fleming et al. | |
| 6,858,462 B2 | 2/2005 | Zaidi et al. | |
| 6,899,096 B2 * | 5/2005 | Nakamura | 126/581 |
| 6,969,874 B1 | 11/2005 | Gee et al. | |
| 6,984,050 B2 * | 1/2006 | Nakamura | 359/853 |
| 7,077,532 B1 | 7/2006 | Diver, Jr. et al. | |
| 7,207,327 B2 * | 4/2007 | Litwin et al. | 126/601 |
| 7,319,556 B1 | 1/2008 | Ackermann et al. | |
| 7,336,351 B1 | 2/2008 | Sweatt et al. | |
| 7,667,833 B1 | 2/2010 | Diver | |
| 7,906,750 B2 * | 3/2011 | Hickerson et al. | 250/203.4 |
| 8,344,305 B2 * | 1/2013 | Convery | 250/203.4 |
| 2010/0018519 A1 * | 1/2010 | McDonald et al. | 126/573 |
| 2010/0031952 A1 * | 2/2010 | Zavodny et al. | 126/573 |
| 2011/0000478 A1 * | 1/2011 | Reznik | 126/574 |

* cited by examiner

*Primary Examiner* — John K Fristoe, Jr.
*Assistant Examiner* — Umashankar Venkatesan
(74) *Attorney, Agent, or Firm* — The JL Salazar Law Firm, PLLC

(57) ABSTRACT

A system and method for optimizing at least one mirror of at least one CSP system is provided. The system has a screen for displaying light patterns for reflection by the mirror, a camera for receiving a reflection of the light patterns from the mirror, and a solar characterization tool. The solar characterization tool has a characterizing unit for determining at least one mirror parameter of the mirror based on an initial position of the camera and the screen, and a refinement unit for refining the determined parameter(s) based on an adjusted position of the camera and screen whereby the mirror is characterized. The system may also be provided with a solar alignment tool for comparing at least one mirror parameter of the mirror to a design geometry whereby an alignment error is defined, and at least one alignment unit for adjusting the mirror to reduce the alignment error.

37 Claims, 12 Drawing Sheets

CONCENTRATION SOLAR POWER OPTIMIZATION SYSTEM AND METHOD OF USING SAME

STATEMENT OF GOVERNMENT INTEREST

This invention was developed under Contract DE-AC04-94AL85000 between Sandia Corporation and the U.S. Department of Energy. The U.S. Government has certain rights in the invention.

BACKGROUND OF THE INVENTION

1. Field of the Invention

The present invention relates to techniques for performing solar operations. More particularly, the present invention relates to techniques for optimizing solar operations by, for example, enhancing characterization and/or alignment of Concentrating Solar Power (CSP) systems.

2. Background of the Related Art

Solar technologies, such as solar collectors (or concentrators), are often used to capture energy from the sun. Some solar collectors, such as parabolic dish, trough, tower and/or other solar power systems, (referred to herein as Concentrating Solar Power or CSP systems) are often used to collect energy from sunlight and concentrate it for use, for example, for the production of electricity. CSP systems typically use one or more mirror facets, reflectors, heliostats or other devices (referred to herein as 'mirrors') to direct (or concentrate) sunlight onto a receiver. A working fluid in the receiver is heated by the sunlight and used for power generation and/or storage using, for example, an engine or a working fluid.

The performance (e.g. efficiency) of the CSP system typically affects the return on investment. This performance may be affected by various factors, such as the shape, alignment, positioning, quality and other parameters of the mirrors used in the CSP system. For example, the operation of the CSP system may be closely coupled to the quality of the reflective surface, and deviations (or errors) in the slope of the mirror's surface from the design shape may impact the performance of the system (e.g. power loss, peak flux increases, etc.)

Attempts have been made to address the impact mirrors have on system performance. Techniques have been developed for characterizing the mirror, for example by determining slope error in the mirror, as described, for example, in Charles E. Andraka et al., "SOFAST: Sandia Optical Fringe Analysis Slope Tool for Mirror Characterization", proceedings of SolarPACES 2009, Berlin Germany, Sep. 15-18 2009, or Charles E. Andraka et al, "Rapid Reflective Facet Characterization Using Fringe Reflection Techniques," Proceedings of ES2009, San Francisco Calif., Jul. 19-23, 2009 (referred to herein as "the SOFAST technique), VSHOT Measurement Uncertainty And Sensitivity Study by Scott A. Jones (referred to herein as "Vshot"); "Automated High Resolution Measurement Of Heliostat Slope Errors" by Steffen Ulmer et al.; "Slope Measurements Of Parabolic Dish Concentrators Using Color-Coded Targets" by Steffen Ulmer, Peter Heller, Wolfgang Reinalter; and "Characterization Of Optical Components For Linear Fresnel Collectors By Fringe Reflection Method" by Anna Heimsath et al, the entire contents of which are hereby incorporated by reference (collectively referred to herein as the "Characterization Techniques").

Techniques have also been developed for aligning CSP systems as described, for example, in U.S. Pat. No. 7,667,833; "Improved Alignment Technique for Dish Concentrators" by Charles E. Andraka et al.; Proceedings of ISEC 2003: 2003 International Solar Energy Conference, Hawaii, 15-18 Mar. 2003; "Development And Characterization Of A Color 2f Alignment Method For The Advanced Dish Development System" by Bridgette J. Steffen et al.; Proceedings of ISEC 2003: 2003 International Solar Energy Conference, Hawaii, 15-18 Mar. 2003, the entire contents of which are hereby incorporated by reference (collectively referred to herein as the "Alignment Techniques").

Despite the development of various solar techniques relating to CSP systems, there remains a need to improve solar operations. It may be desirable to provide a system that optimizes the performance of the CSP system and/or its components. Such optimization may involve enhanced characterization and/or alignment of the mirror(s). It may be further desirable that such optimization be performed quickly, for example, in real time. Preferably, such techniques involve one or more of the following, among others: accurate measurement and/or characterization, estimation and refinement capabilities, fast computations, adjustable systems, manufacturing and/or maintenance capability, hi-speed operability, portable systems, real-time alignment, etc.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE INVENTION

Presently preferred embodiments of the invention are shown in the above-identified figures and described in detail below. Embodiments are described with reference to certain features and techniques of solar optimization systems for characterizing and/or aligning mirrors and/or CSP systems. As such, depicted embodiments focus on advantages, such as optimizing characterization and alignment using a unitary configuration capable of generating results in real-time, made available by the use of a solar characterization tool and/or a solar alignment tool. While specific configurations of a solar optimization system are depicted with specific mirror and CSP systems, other combinations and/or configurations may also be used. That is, the solar optimization system may be used in connection with any mirror and/or mirror system. Further, the solar optimization system may be used to enhance characterization by concentrating on slope characterization in a format that is tailored for solar applications, and uses an 'electronic boresight' approach to eliminate sensitivity to setup errors. Embodiments described herein are employed include the solar optimization system positionable about one or more mirrors, while employing a solar characterization tool for characterizing the mirror. The embodiments may further employ a solar alignment tool positionable about one or more CSP systems for aligning one or more mirrors thereof.

Preferably, the solar optimization system 100 is configured in a manner that combines the display, capture, and data reduction in an integrated system. This optimized configuration is designed to allow rapid capture and data reduction. An 'electronic boresight' approach can be used to accommodate physical equipment positioning errors, making the system insensitive to setup errors. A very large number of points are determined on each facet to provide significant detail as to the location and character of the errors. While existing systems that typically resolve data to shape determination may be used, the present optimized system 100 may be used to concentrate on slope characterization and reporting in a format that is tailored to the solar applications.

Figure 1:
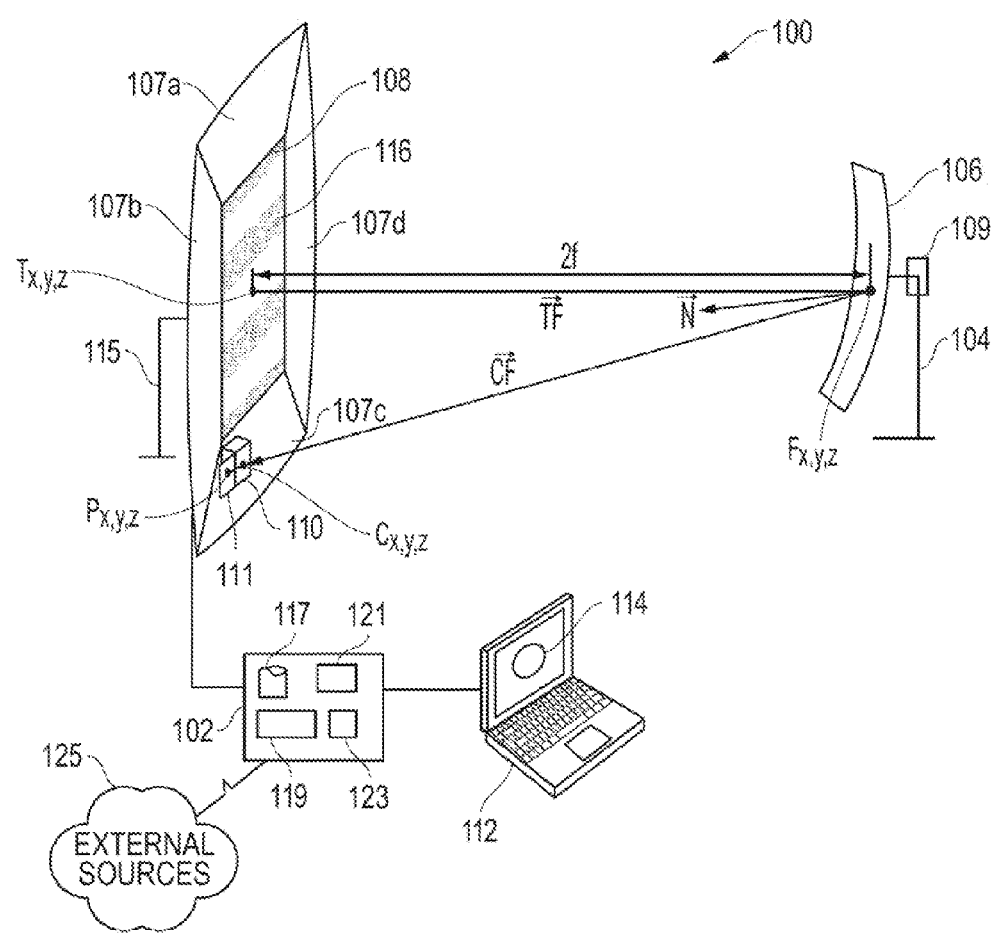
FIG. 1 is a schematic diagram depicting a solar optimization system coupled to a mirror for generating an image thereof, the solar optimization system comprising a solar characterization tool.

FIG. 1 is a schematic diagram depicting a solar optimization system 100 comprising a solar characterization tool 102. As shown, the solar optimization system 100 comprises a platform 104 for supporting a mirror 106, a display screen (or target or projector) 108, a camera 110 and a display 112 for providing an image (or depiction) 114 of the results of the analysis relating to the mirror 106.

The mirror 106 may be any mirror usable with various CSP systems, such as the parabolic dish, trough and tower CSP systems of, for example, FIGS. 3A, 4A and 5A, respectively, as will be described further herein. The mirror 106 may be of any size and/or shape (such as rectangular, flat, curved, spherical, parabolic, etc.) usable with a desired CSP system. The mirror 106 may be adjustably supported by platform 104. The platform 104 may be a simple stand for supporting the mirror 106, but preferably has an adjuster 109 for automatic and/or manual positioning of the mirror 106. An adjuster may also be provided for selectively adjusting the position of the camera and/or screen, as well as other components as desired. Such adjustments may be optionally be, for example, manual with visual, verbal, wireless, or other feedback mechanism, semi-automatic in which manually-installed and removed tools implement the strategy, or fully automatic, in which robotically-installed tools perform the full adjustment.

The screen 108 is preferably positioned a distance 2f (twice the focal length of the mirror) from the mirror 106. At this distance, a small screen may be used. However, some embodiments, such as for heliostats for tower CSP systems, may utilize a large projection screen in lieu of locating at the 2f position as will be described further herein. A support 115 is preferably provided to hold the screen 108 and camera 110 in position. The screen 108 is preferably able to display a fringe (or light) pattern 116, and may be provided with a plurality of colored portions (or run-out areas) 109a-d, which may be used in coarse alignment to guide the mirrors 106 to the display screen 108 as will be described further herein. These colored portions 109a-d may be, for example, colored canvas or paper mounted about the screen 108. Preferably, each of the colored portions 109a-d is a different color, such as red, blue, green and yellow. While four colored portions 109a-d are provided, any number of colored portions may optionally be provided if desired to enhance imaging of the mirror 106 as will be described further herein.

As shown, the solar optimization system 100 displays a fringe pattern 116 on the screen 108 in preferably a sinusoidal pattern of alternating dark and light displayable at various phases on the screen 108. This solar characterization tool 102 may be used to determine geometry of the mirror 106 based on a reflection in the mirror 106 of the fringe patterns 116 displayed on screen 108. Such determined geometry may include, for example, a point Fxyz on the mirror 106, a pixel location Pxyz on a camera pixel plane 111, a lens location Cxyz of camera 110, a mirror-camera vector $\overline{CF}$, a mirror to target vector $\overline{TF}$, and a normal vector $\overline{N}$ extending from the mirror 106. The process may be performed simultaneously for multiple points across the mirror viewed by multiple pixels across the camera pixel plane 111.

As shown, the solar characterization tool 102 has a database 117, characterization unit 119, refinement unit 121, and transceiver 123. The database 117 may be a conventional database for receiving, collecting, storing and/or transferring, for example, data from the solar optimization system 100, historical data, processed data, external and/or internal data, etc. The transceiver 123 may be a conventional transceiver for communicating with various components of the solar optimization system 100 and/or with external sources 125. Various communication links may be provided for operatively connecting the solar characterization tool 102 with the components and/or external sources 125.

The characterization unit 119 of the characterization tool 102 may receive data from the database 117 and perform calculations, analyze data, generate models and/or otherwise process the data. The characterization unit 119 is preferably capable of generating an image 114 of resultant measurements for display on display 112. The characterization unit 119 may perform the characterization analysis as described, for example in the Characterization Techniques as previously incorporated herein by reference. The characterization unit 119 may be integral with or coupled to a refinement unit 121 for selective operation therewith.

The refinement unit 121 may also be used to perform calculations, analyze data, generate models and/or otherwise process the data. In some cases, the refinement unit 121 may perform additional calculations, make new assumptions and/or re-perform functions performed by the characterization unit 119. The refinement unit 121 may perform a refined characterization analysis as will be described further herein. The refined characterization analysis may involve performing characterization and/or refinement using the characterization unit 119 and/or refinement unit 123, preferably until convergence is achieved. Output generated by the characterization 119 and/or refinement 121 units may be stored in database 117, communicated via transceiver 123 and/or further processed internally and/or externally to the solar characterization tool 102.

Various characterization techniques may be used with the solar optimization system 100 of FIG. 1 to characterize the mirror 106, such as the Characterization Techniques previously incorporated by reference herein. Preferably, the solar optimization system 100 is used in connection with a fringe characterization technique for characterizing the solar optimization system 100 using the SOFAST technique. Aspects of the other Characterization Techniques may be employed with the SOFAST technique, if desired. The solar optimization system 100 is further capable of performing additional refinement, alignment and other techniques for optimizing the characterization, alignment and/or other performance parameters of the mirror and/or CSP system used therewith as will be described further herein.

In an example using the optimization system 100 and the solar characterization tool 102, an output image 114 may be displayed on display 112 and/or stored in database 117. To generate the images 114, the camera 110 images the mirror 106, which is positioned so that it views a reflection of the screen 108. A series of fringe patterns 114 are displayed on the screen 108 while images are captured by the camera 110 and sent to the solar characterization tool 102. Using the captured information, the solar characterization tool 102 can determine a reflected target location of each pixel of the mirror 106 viewed. By mathematical transformation of the collected pixel information, a surface normal vector map of the mirror 106 can be developed. This map may then be fitted to the selected model equation, and errors in the mirror 106 from its designed shape surface normals may be characterized.

The lens of camera 110 may be considered as a pinhole or single x,y,z position in space (Cxyz). Each point (Fxyz) on the mirror 106 can be determined through geometry and ray tracing. The pixel location (Pxyz) is projected through Cxyz, and intersects with the parabolic surface of the mirror 106 to determine Fxyz. Finally, through the fringe analysis, the return location at the screen 108, Txyz, of each pixel can be determined. Given these three points (Txyz, Cxyz, and Fxyz), the incoming $\overline{CF}$ and outgoing $\overline{TF}$ vectors may be determined at each point. The surface normal $\overline{N}$ of the mirror 106 may then be determined using a standard law of reflection.

The solar optimization system 100 is preferably positioned such that all (or most) of the mirror 106 'sees' the screen 108 from the point of view of the camera 110. This may be accomplished by displaying a target on screen 108, and positioning the mirror 106 while monitoring the camera 110 image. The screen 108 may be any screen capable of displaying the desired images for reflection of a mirror 106, such as an LCD monitor, plasma, projection screen or other surface, preferably capable of displaying an all white image and grayscale fringe patterns or colored fringe patterns. As shown, the screen 108 is a dynamic or changeable screen capable of displaying images. The plurality of color screen portions 107a-e extending about the screen may be fixed in color, rather than active and variable. A poorer quality mirror, or a mirror not located at the 2f position 106, may require a larger screen 108 to provide a full characterization. A multiplicity of screens 108 placed adjacent to each other, or a single moveable screen, may be used to perform the function of a single large screen 108.

For production optimization, the mirror 106 is preferably placed in a pre-determined position, for example in a known arrangement or in a fixture by a robotic handler for repeatable positioning. In addition, 'electronic boresighting' may be used to analytically rotate the mirror 106 into a reference coordinate system for modeling. Captured information may be identified for an archival library of mirror measurements.

Optionally, the solar optimization system 100 may also be applied to production optimization as will be described further with respect to, for example, FIGS. 3A-5B. Basic characterization techniques, such as the techniques described with respect to FIGS. 1-2C may be used for performing alignment techniques. The solar characterization tool 102 may be used in conjunction with a solar alignment tool 330 customized for the various solar applications as will be described further herein.

FIGS. 2A-2D are blown up views of examples of the images 114 containing depictions 220a,b,c,d, respectively, that may be provided as the image 114 of FIG. 1. The image 114 preferably provides a graphical depiction of the mirror 106 based on data collected by the various solar optimization systems 100, the solar characterization tool 102 and/or solar the alignment tool 330 described herein. The displays may be selectively configured to generate, for example, data streams, 2-D contour plots, 3-D images of the mirrors and/or CSP systems being analyzed, etc.

Figure 2A:
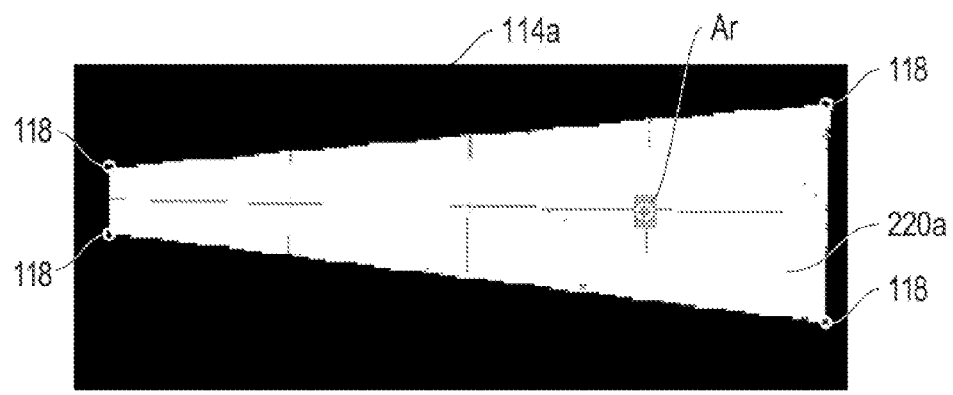
FIGS. 2A-2D are schematic depictions of images displayed by the solar optimization system of FIG. 1.
Figure 2B:
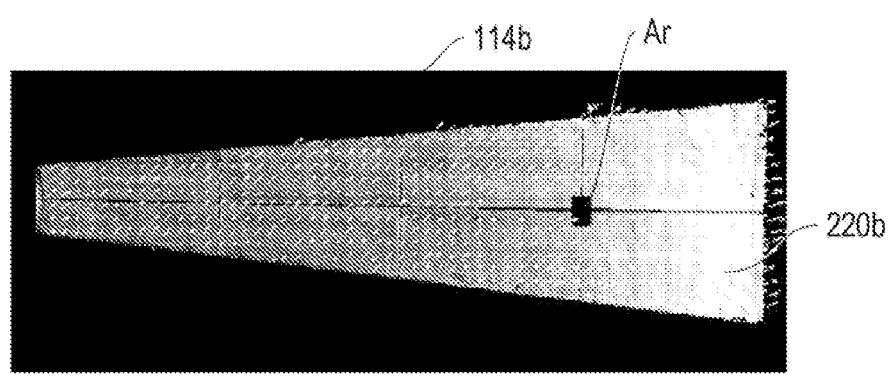
Figure 2C:
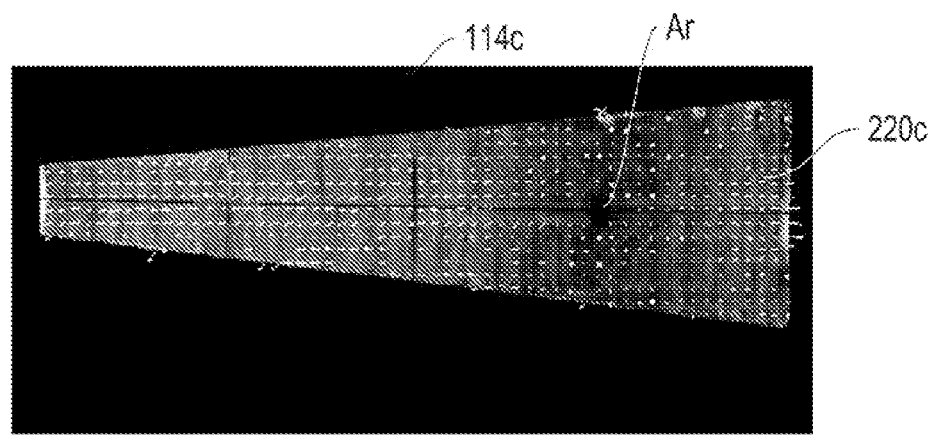
Figure 2D:
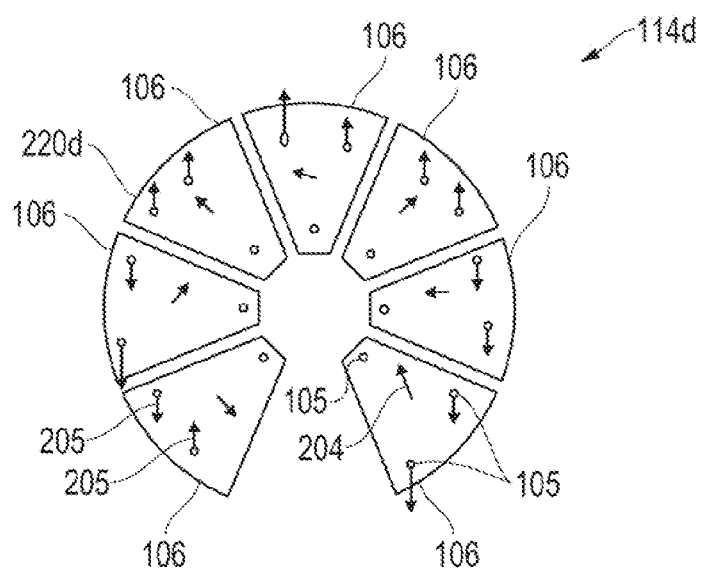

By way of example, FIGS. 2A-2D depict various depictions 220a-d, respectively, that may be displayed by display 112 of FIGS. 1-5B. FIG. 2A depicts a mask 220a defining points 118 and/or edges 127 of a mirror 106 that may be generated during coarse alignment. FIG. 2B depicts an image 220b of the mirror 106 that may be generated during initial characterization. As shown in FIG. 2B, the image 220b is a view or error plot of the mirror 106 as initially measured, and depicts slope errors along the mirror in the form of vectors having direction and magnitude. The general direction of the vectors indicates how the mirror is tilted relative to the measurement system. FIG. 2C depicts an image 220c of the mirror 106 that may be generated during refinement. As shown in FIG. 2C, the image 220c is a refined view or error plot of the mirror 106 in the Mirror Coordinate System, and depicts slope errors along the mirror in the form of vectors having direction and magnitude. The apparent mirror coordinate system has been aligned with the measured mirror such that the error is minimized at a point 'A' on the mirror. FIG. 2D depicts an image 220d of a CSP system 300a that may be generated during alignment. The image 220d shows mirror 106 with vectors 204 for total tilt error and 205 for proposed adjustments to remove the measured tilt, each vector having a given length (indicating magnitude) and direction for alignment. Adjustable mounts 105 are provided on the mirrors 106 for adjusting the mirror 106 according to the vectors 205 and 204. The methods used to generate each of these images will be described further herein.

Figure 3A:
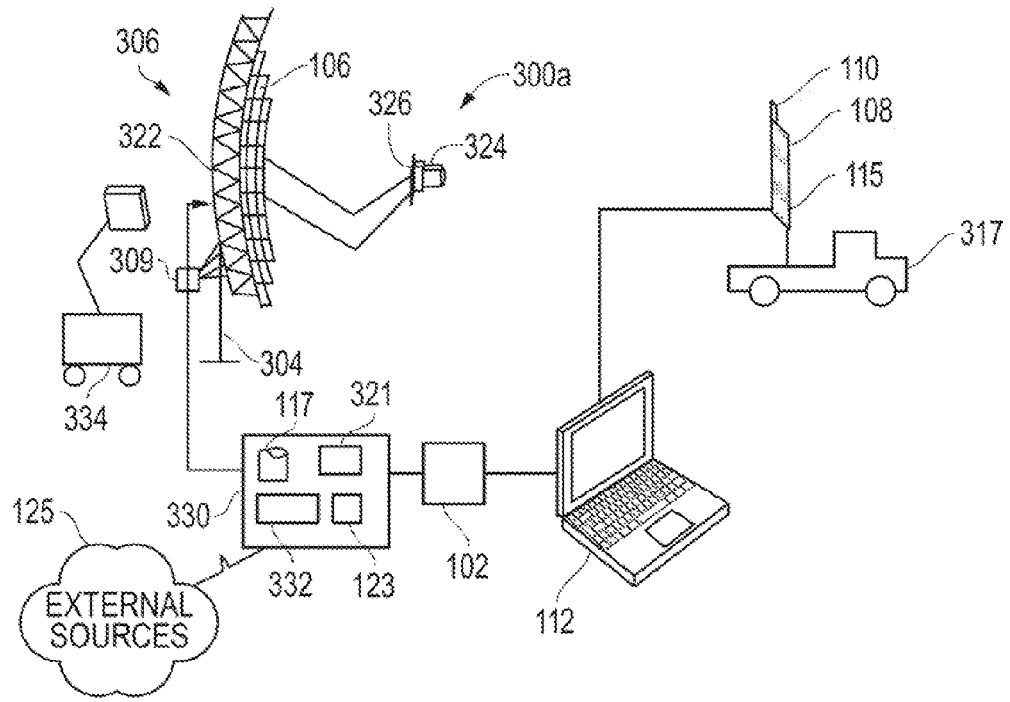
FIGS. 3A-3C are schematic diagrams of a solar optimization system coupled to a parabolic dish CSP system in various configurations, the solar optimization system comprising a solar characterization tool and a solar alignment tool.
Figure 3B:
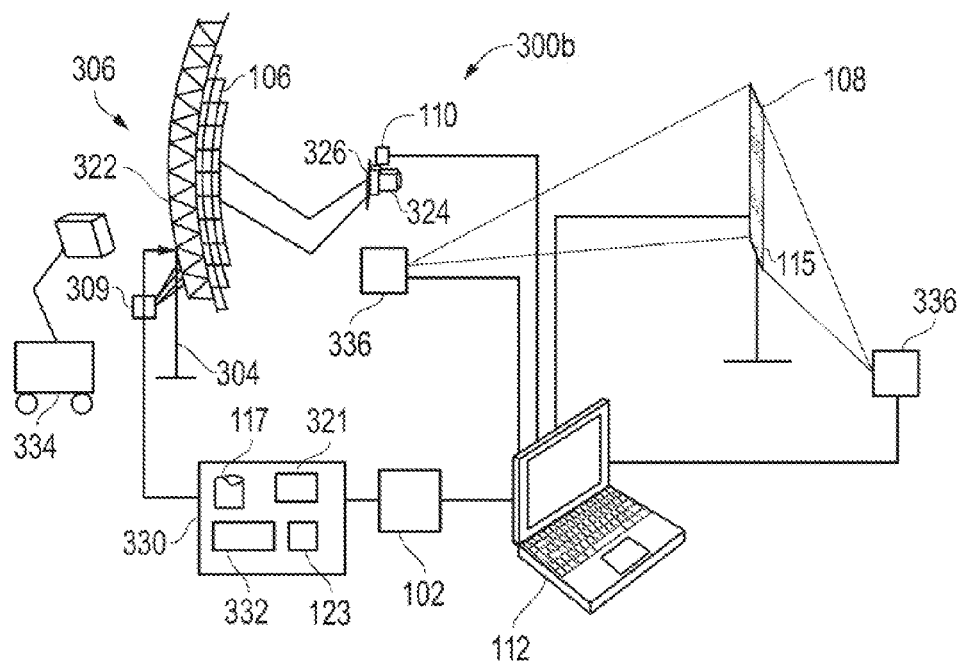
Figure 3C:
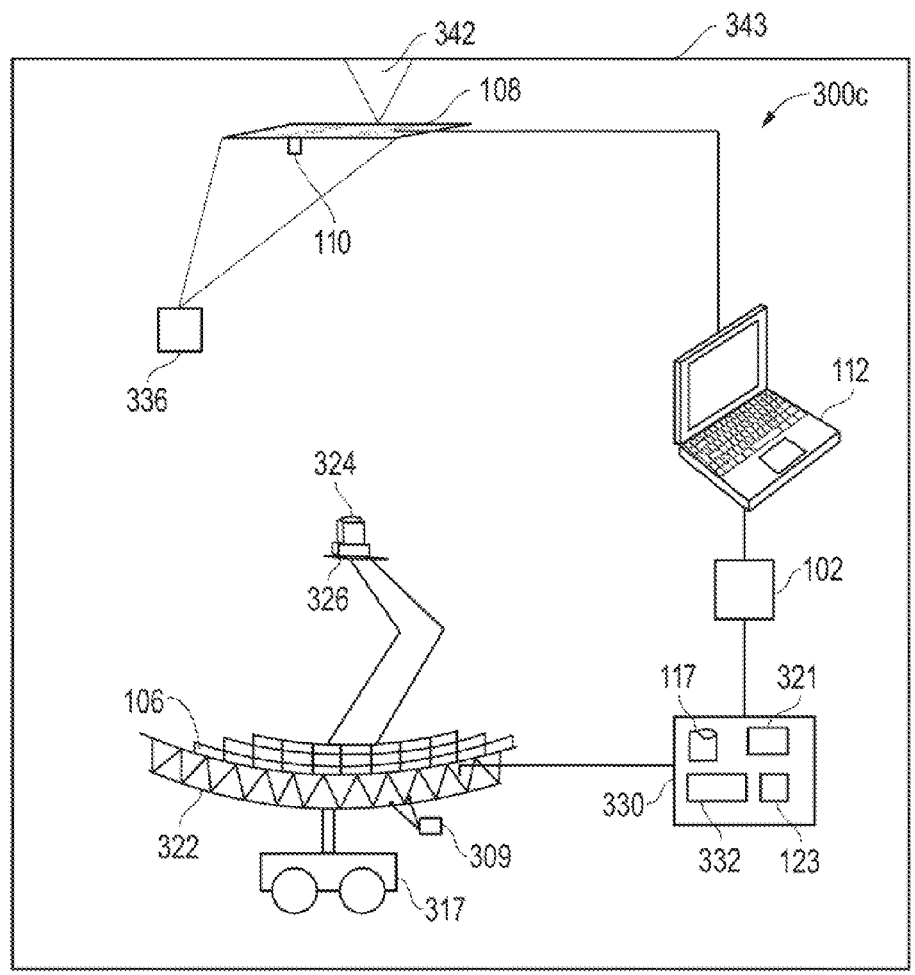

FIGS. 3A-3C are schematic diagrams of a solar optimization system 300a,b,c coupled to a parabolic dish CSP system 306 in various configurations. In each of these figures, the solar optimization system 300a,b,c comprises a solar characterization tool 102 for characterizing mirror(s) 106 of the CSP system 306, and a solar alignment tool 330 for adjusting mirror(s) 106 and/or the CSP system 306. The parabolic dish CSP system 306 may be a conventional CSP system with a plurality of mirrors 106 on a mirror base 322 supported by a platform 304. In most cases, the mirrors 106 are adjustably mounted on the mirror base 322 with adjustable mounts 105 (or screws, bolts, studs, locking collars, other means of securing or adjusting the position of the mirror) that may be selectively tightened or otherwise adjusted to position the mirror 106 as desired relative to the mirror base 322. One or more adjusters 309 may be coupled to the adjustable mounts 105 for adjustment of the CSP system 306. Preferably, a fiducial (or marker or aim point) 324 can also be provided on an engine mount 326 extending from the mirror base 322 to facilitate alignment of the reflected energy to an engine or receiver package. Fiducials may be used to designate other key points on the dish structure as needed. One or more of the mirrors 106 of the CSP system 306 may be, for example, the mirror 106 of FIG. 1.

The solar optimization system 300a of FIG. 3A may be similar to the solar optimization system 100a, except that the support 115 is a mobile system positionable on a mobile platform 317 for selectively positioning the screen 108 and camera 110 in a desired position relative to the CSP system 306. The mobile platform 317 may be, for example, a truck for positioning the optimization system 100 at a desired position about the parabolic dish CSP system 306, such as at a 2f distance from the CSP system 306.

The display 112, solar characterizing tool 102 and solar alignment tool 330 of the solar optimization system 300a may be operatively connected to the CSP system 306 for operation therewith. Preferably, solar alignment tool 330 is provided for implementing a desired aligned position and selectively adjusting the CSP system 306 and/or its mirror(s) to implement alignment of the CSP system 306 to the aligned position as determined by the characterization system 102. The controller 332 may be configured to operate adjusters 309 to automatically reposition the parabolic dish CSP system 306 and/or the mirrors 106 therein. A lift 334 may also be provided to allow an operator (not shown) to be positioned about the parabolic dish CSP system 306 for making manual or semi-automatic adjustments thereto with feedback communication from controller 332 preferably in real-time or after characterization. As adjustments are made, characterization may be repeated and the alignment refined.

The solar characterization tool 102 may be the same as in FIG. 1. The solar alignment tool 330 has a database 117, alignment unit 321, controller 332 and transceiver 123. The database 117 and transceiver 123 may be the same as those of the solar characterization tool 102 of FIG. 1, except that they are operatively connected to the alignment unit 321 and controller 332 for operation therewith. The alignment unit 321 may receive data from the database 117 and perform calculations, analyze data, generate models and/or other wise process the data. The alignment unit 321 is preferably capable of generating images 114d for display on display 112. The alignment unit 321 may perform an alignment analysis as will be described further herein. The alignment unit 321 may be integral with or coupled to the solar characterization tool 102 and its components for selective operation therewith.

In some cases, the alignment unit 321 may perform additional calculations, make new assumptions and/or re-perform functions performed by the characterization unit 119 and/or refinement unit 121 of the solar characterization tool 102. The alignment analysis may involve performing characterization, refinement and/or alignment using the characterization unit 119, refinement unit 121 and/or alignment unit 321, preferably until convergence is achieved. Output generated by the characterization 119, refinement 121 and/or alignment 321 units may be stored in database 117, communicated via transceiver 123 and/or further processed internally and/or externally to the solar characterization tool 102 and/or alignment tool 330. Preferably, the operation of the tools 102 and 330 are integrated for synergistic operation.

The controller 332 may be operatively connected to various components of the solar optimization system 300 and/or external sources 125 for passing signals therebetween. The controller 332 may communicate via transceiver 123 or be coupled thereto. The controller 332 is preferably capable of sending command signals to the CSP system 306 and/or associated tools, such as adjuster 309, lift 334 or other components for activation thereof. Preferably, the controller 332 receives commands from the solar alignment tool 330 indicating adjustments to be made to the one or more mirrors 106, CSP system 306 and/or solar alignment tool 300a. Automatic adjustments may be made by the controller 332 for activating the adjustor(s) 309, if available. Manual adjustments may be made by operators receiving instructions from the controller 332 and/or solar alignment tool 321.

Preferably, the controller 332 is able to adjust the mirrors 106 and/or CSP system 306 to optimize the performance of the CSP system 306 and/or the power generated thereby. The controller 332 may also be used to adjust the performance of the solar optimization system 300a to adjust, for example, the camera 110, screen 108, fringe pattern 116, or other components thereof. The data collection, analysis, display and/or other functions may also be adjusted by the controller 332.

FIG. 3B shows the parabolic dish CSP system 306 coupled to a solar optimization system 300b with the projector 336 at alternative locations about the screen 108. The projector 336 can be on either side of the screen 108, in front of an opaque screen or behind a translucent screen for rear projection. In this configuration, the camera 110 can be positioned about the engine mount 326 or at any other position not restricted to the 2f location. With the camera positioned between the screen 108 and the CSP system 306, the projectors 336 may be provided to display the fringe pattern 116 on the screen 108.

FIGS. 3B (and 5B as will be described later) may involve cases with very large mirrors having a large focal length. In such cases, it may be difficult to position the camera 110 and screen 108 at the 2f position. Projectors, such as projector 336 may be positioned to display fringe patterns 116 on the very large screens (e.g., projection or movie screens). Such projectors may emit an image from a back or front side of the screen 108. Preferably, the screen 108 is about the same size as the mirror 106 being tested.

FIG. 3C shows the parabolic dish CSP system 306 of FIG. 3A positioned on a mobile platform 317 below the optimization system 300c. In this configuration, the optimization system 300a may be positioned in an alignment facility 343, such as a shed or tent, for optimizing and/or otherwise maintaining CSP systems 306 that are positioned therein. The optimization system 300c may be mounted in the facility 343 and calibrated for use on a variety of CSP systems. Preferably, the facility 343 is configured such that the CSP systems positioned therein are positioned in a pre-determined position. This allows CSP systems to be brought to a central facility for alignment in a controlled and consistent environment for alignment.

As shown, the mirror base 322 with the mirrors 106 thereon is placed on the platform 317. Preferably, the platform 317 is mobile for placing the CSP system 306 in a desired position for optimization. As shown, the CSP system 306 is positioned on the platform 317 in a supine position for transport and ready access to adjustable mounts on the back of the mirror support 322. The CSP system 306 is positionable below the optimization system 300c, with the CSP system mirrors generally pointing upward and with the fiducial 324 and engine mount 326 in a vertical position above the dish. The screen 108 and camera 110 of the optimization system 300c are preferably also positioned above the mirrors 106 at a distance of about 2f and mounted preferentially together on a bracket 342. Optionally, the screen 108 may be an LCD screen, or a projection screen with a front or rear projector 336 as shown.

The solar alignment tool 330 of FIGS. 3A-3C is preferably configured to define adjustments for the mirrors 106 and/or CSP system 306 to optimize performance of the CSP system 306. In some cases, one or more mirrors 106 and/or the adjustable mounts 105 supporting one or more mirrors 106 on mirror base 322 may be adjusted to improve the performance of the CSP system 306. Other portions of the CSP systems, such as the engine mount 326, mirror base 322 and/or others, may be adjusted to enhance the power generated thereby. One or more adjustable mounts 105 holding mirrors 106 in place on the mirror support 322 may be selectively tightened, loosened or otherwise adjusted. These adjustments preferably alter the position and/or shape of the mirror 106 and, therefore, the ability of the mirror 106 to direct light accurately. These and/or other adjustments may be made automatically by actuators (e.g., adjustor 309), or manually using hand tools with feedback communication.

Figure 4A:
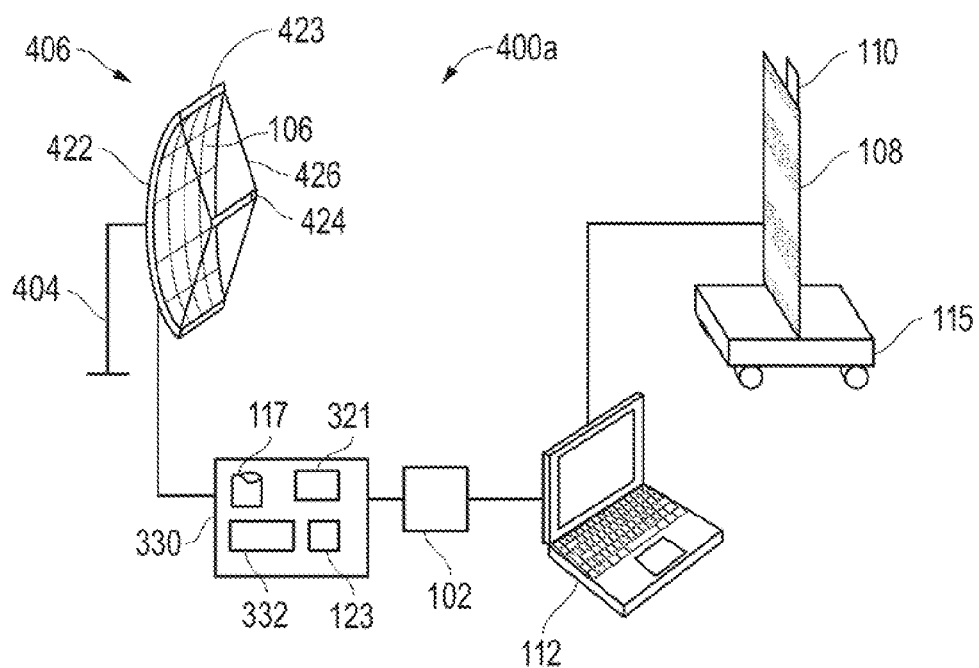
FIGS. 4A-4B are schematic diagrams of a solar optimization system coupled to a trough CSP system in various configurations, the solar optimization system comprising a solar characterization tool and a solar alignment tool.
Figure 4B:
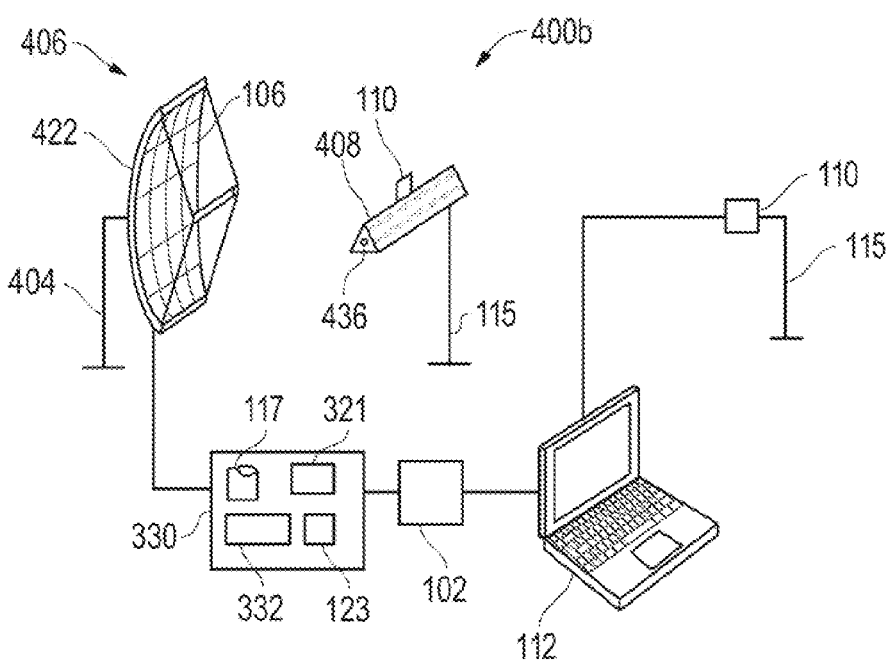

FIGS. 4A-4B are schematic diagrams of a solar optimization system 400 coupled to a trough CSP system 406 in various configurations. In each of these figures, the solar optimization system 400a,b comprises a solar characterization tool 102 for characterizing mirror(s) 106 of the CSP system 406, and a solar alignment tool 330 for adjusting mirror(s) 106 and/or the CSP system 406. The trough CSP system 406 may be a conventional CSP system 406 with a plurality of mirrors 106 on a mirror base 422 supported by a platform 404 coupled to a heat receiver tube 423 on an engine receiver mount 426. A fiducial (or marker) 424 may be positioned about the engine receiver mount 426 or the receiver tube 423. One or more of the mirrors 106 of the CSP system 406 may be, for example, the mirror 106 of FIG. 1. The CSP system 406 may also be provided with an adjuster 309 similar to the one in FIG. 3A. One or more such adjusters 309 may be used in connection with one or more CSP systems as desired.

The mobile solar optimization system 400a of FIG. 4A may be similar to the solar optimization system 100a, except that the screen 108 and camera 110 are positionable on a transport 115 for selectively positioning in a desired position relative to the CSP system 306. The transport 115 may be, for example, a wheeled cart for positioning the optimization system 400a at a desired position about the trough CSP system 406, such as at a 2f distance from the CSP system 406, and preferably may also be able to translate the optimization 400a along the length of the CSP system 406 during an alignment or characterization process. The optimization system 400a may also be provided with the solar characterizing tool 102, the solar alignment tool 330, the controller 332, and/or the lift 334 (see, e.g., FIG. 3A). The mobility of the optimization system 400a allows positioning of the system along the length of the trough CSP system 406 to perform alignment of each mirror 106 section or group.

The display 112, solar characterization tool 102 and solar alignment tool 330 of the solar optimization system 400a may be operatively connected to the CSP system 406 for operation therewith. Preferably, solar alignment tool 330 is provided for determining a desired aligned position and selectively adjusting the CSP system 406 and/or its mirror(s) 106 to the aligned position. A controller 332 may be configured to operate adjusters 309 to automatically reposition the parabolic dish CSP system 406 and/or the mirrors 106 therein. A lift 334 (FIG. 3A) may also be provided to allow an operator (not shown) to be positioned about the parabolic dish CSP system 406 for making manual adjustments thereto.

FIG. 4B shows the trough CSP system 406 coupled to a solar optimization system 400b with pivot 436. In this configuration, screens 408 are pivotally mounted to a pivot 436. The pivot 436 with the screens 408 thereon is positioned adjacent to camera 110 and the CSP system 406 for displaying the fringe pattern thereon. The camera is mounted to support 115. The pivot 436 may be selectively rotated to display each of the screens 408. Preferably, each of the screens 408 may have a fixed (printed) fringe pattern 116 to be used to generate the desired images. In this example, the screen 408 is a set of fixed fringe patterns 116 that may be pivotally positioned using the pivot 436 to display the desired fringe pattern 116 for reflection. The pivot 436 may be positioned at a desired distance from the CSP system 400a, preferably at the 2f location. The screen may have one or more sides (e.g., triangular, rectangular, etc.) to provide fringe patterns with various phase shifts. As shown, the screen 408 is triangular and has three sides. While three screens 408 are shown rotatably positionable relative to the CSP system 406, it will be appreciated that one or more screens 408 with various fringe patterns 116 may be provided. While the screens 408 are shown rotatably positionable relative to the CSP system 406, it will be appreciated that any means of positioning multiple screens or patterns may be provided.

Optionally, the camera 110 may be positioned near the screen 408 and/or the screen 408 may be positioned near the camera 110. Preferably, the camera 110 and screen 408 are positioned at the 2f position of the CSP system 406a. In some cases, the length of screen 408 may exceed the length of the trough of the CSP system 406a to facilitate characterization and/or alignment of the entire trough with a single camera 110. Multiple cameras may also be positioned about the CSP system 400a and screen 108 such that every mirror 106 of the trough reflects the screen 408 to at least one of the cameras.

Figure 5A:
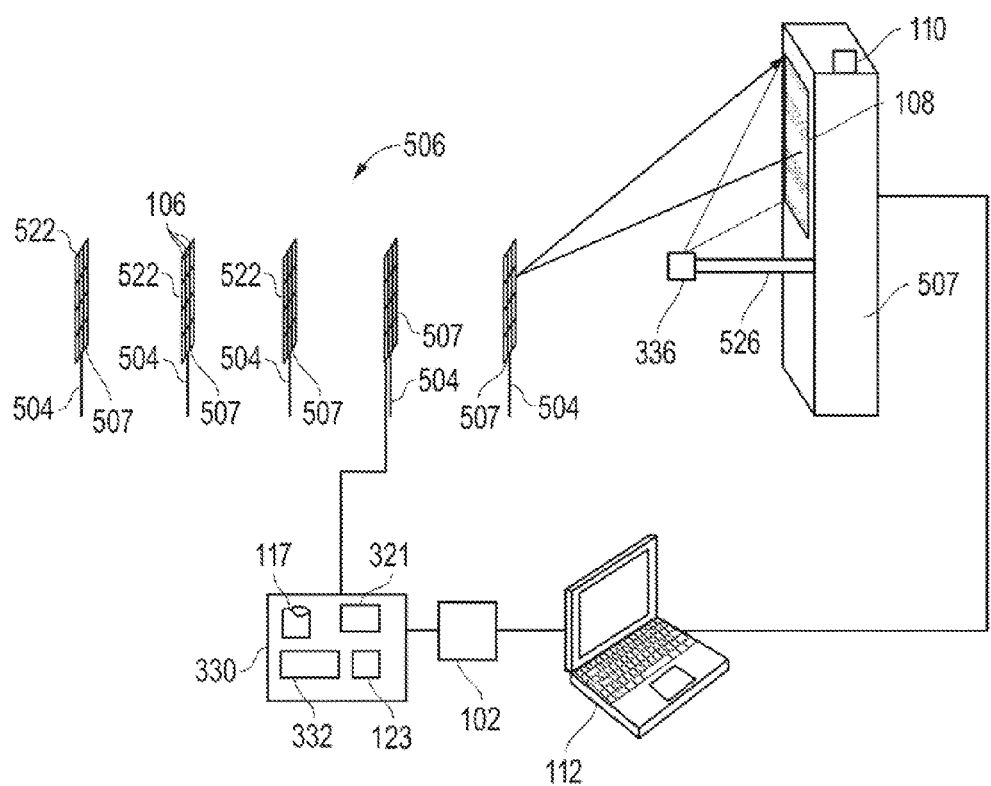
FIGS. 5A-5B are schematic diagrams of a solar optimization system coupled to a tower CSP system in various configurations, the solar optimization system comprising a solar characterization tool and a solar alignment tool.
Figure 5B:
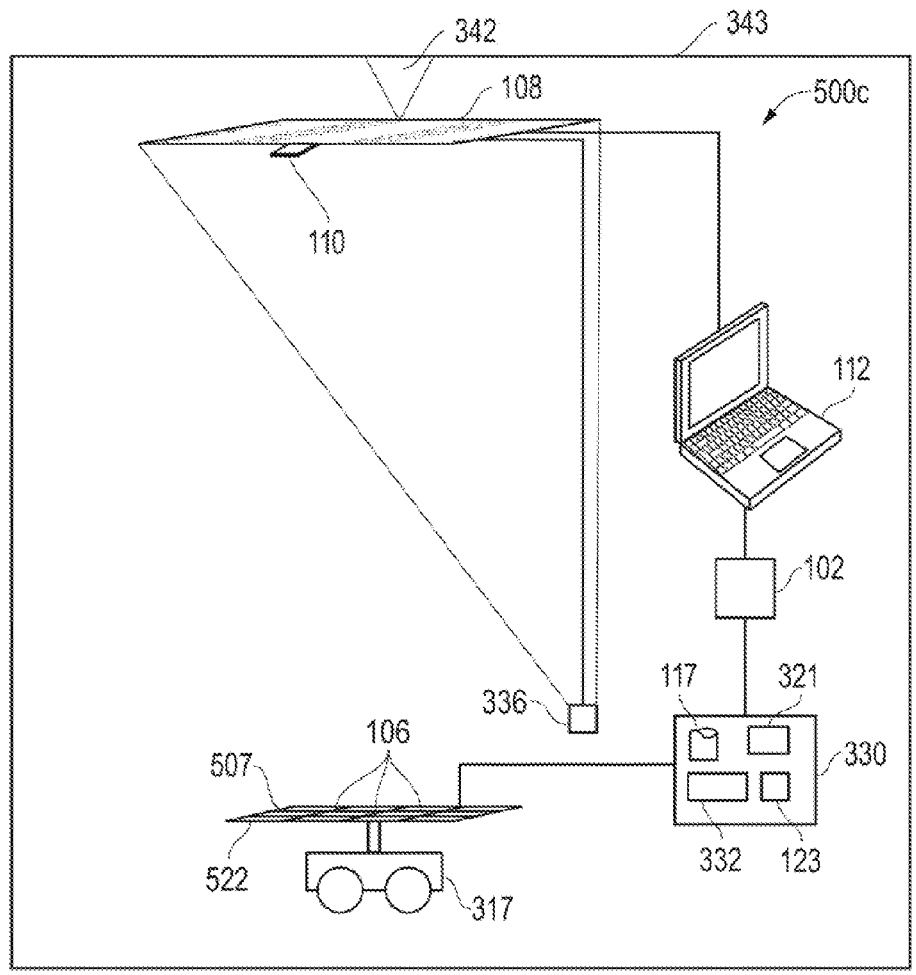

FIGS. 5A-5B are schematic diagrams of a solar optimization system 500 coupled to a tower CSP system 506 in various configurations. In each of these figures, the solar optimization system 500a,b comprises a solar characterization tool 102 for characterizing mirror(s) 106 of the CSP system 506, and a solar alignment tool 330 for adjusting mirror(s) 106 and/or the CSP system 506. The tower CSP system 506 may be a conventional CSP system 506 with a plurality of heliostats 507. Each heliostat 507 has a plurality of mirrors 106 on a mirror base 522 supported by a platform 504. Each heliostat works in combination with a tower 509. The tower 509 has a projector 336 on a frame 526 and a screen 108. One or more of the mirrors 106 of the CSP system 506 may be, for example, the mirror 106 of FIG. 1. The CSP system 506 may also be provided with an adjuster 309 similar to the one in FIG. 3A. The screen 108 may be opaque (front projection) or translucent (rear projection, with projector 336 behind the screen)

The solar optimization system 500a of FIG. 5A may be similar to the solar optimization system 100a, except that the screen 108 and camera 110 are positionable on tower 509. Preferably, the screen 108, camera 110 and/or other components are temporarily mounted to the tower 509. Projector 336 may be positioned on frame 526 for displaying the fringe images 116 on the screen 108. The optimization system 500a may also be provided with the solar characterizing tool 102, the solar alignment tool 330, the controller 332, and/or the lift 334 (see, e.g., FIG. 3A).

The display 112, solar characterizing tool 102 and solar alignment tool 332 of the solar optimization system 500a may be operatively connected to the CSP system 506 for operation therewith. Preferably, solar alignment tool 330 is provided for determining a desired aligned position and selectively adjusting the CSP system 506 and/or its mirror(s) 106 to the aligned position. A controller 332 may be configured to operate adjusters 309 to automatically reposition the heliostat 507 of the tower CSP system 506 and/or the mirrors 106 therein. A lift 334 (FIG. 3A) may also be provided to allow an operator (not shown) to be positioned about the tower CSP tower system 506 for making manual adjustments thereto.

FIG. 5B shows one heliostat 507 of the tower CSP system 506 of FIG. 5A positioned on a mobile platform 317 below the optimization system 500b. The optimization system 500b may be the same as the optimization system 300b of FIG. 3C, except that the screen is larger and is used with a projector 336 positioned at an operable distance therefrom. Depending on the size of the mirror 106 and available distance, an LCD or screen may be used with the applicable set up. As shown in FIG. 3C, an LCD may 6e employed at the 2f distance. However, in FIG. 5B, a large projection screen is used since the mirror is too large and the focal length too long to permit convenient placement of the screen at the 2f distance.

As shown, the mirror base 522 with the mirrors 106 thereon is placed on the mobile platform 317. Preferably, the mobile platform 317 is mobile for placing the CSP system 506 in a desired position for optimization. As shown, the CSP system 506 is positioned on the mobile platform 317 in a supine position for transport and alignment. The screen 108 and camera 110 of the optimization system 300c are preferably also mounted above the mirrors 106 via bracket 342 at a convenient distance. One or more heliostats 522 and/or mirrors 106 of one or more CSP systems 506 may be optimized in the optimization system 500b. By optimizing each of the heliostats 522 and the mirrors therein, the entire CSP system 506 is preferably aligned using a consistent setup. In addition, the mirrors may be aligned in a controlled environment with easy access to the adjustable mounts, facilitating rapid alignment in a production environment.

While FIGS. 3A-5B depict various solar optimization systems in various configurations for characterization and/or alignment of specific CSP systems, it will be appreciated by one of skill in the art that components and/or configurations may be selected for use in performing a desired alignment. For example, the mobile platform 317 may be used with any of the systems, and an adjuster 309 may be operatively connected to various components of any of the CSP systems. Controllers and/or adjustment mechanisms may be positioned about the CSP systems to make any adjustments necessary to optimize the operation of the CSP system.

Figure 6A:
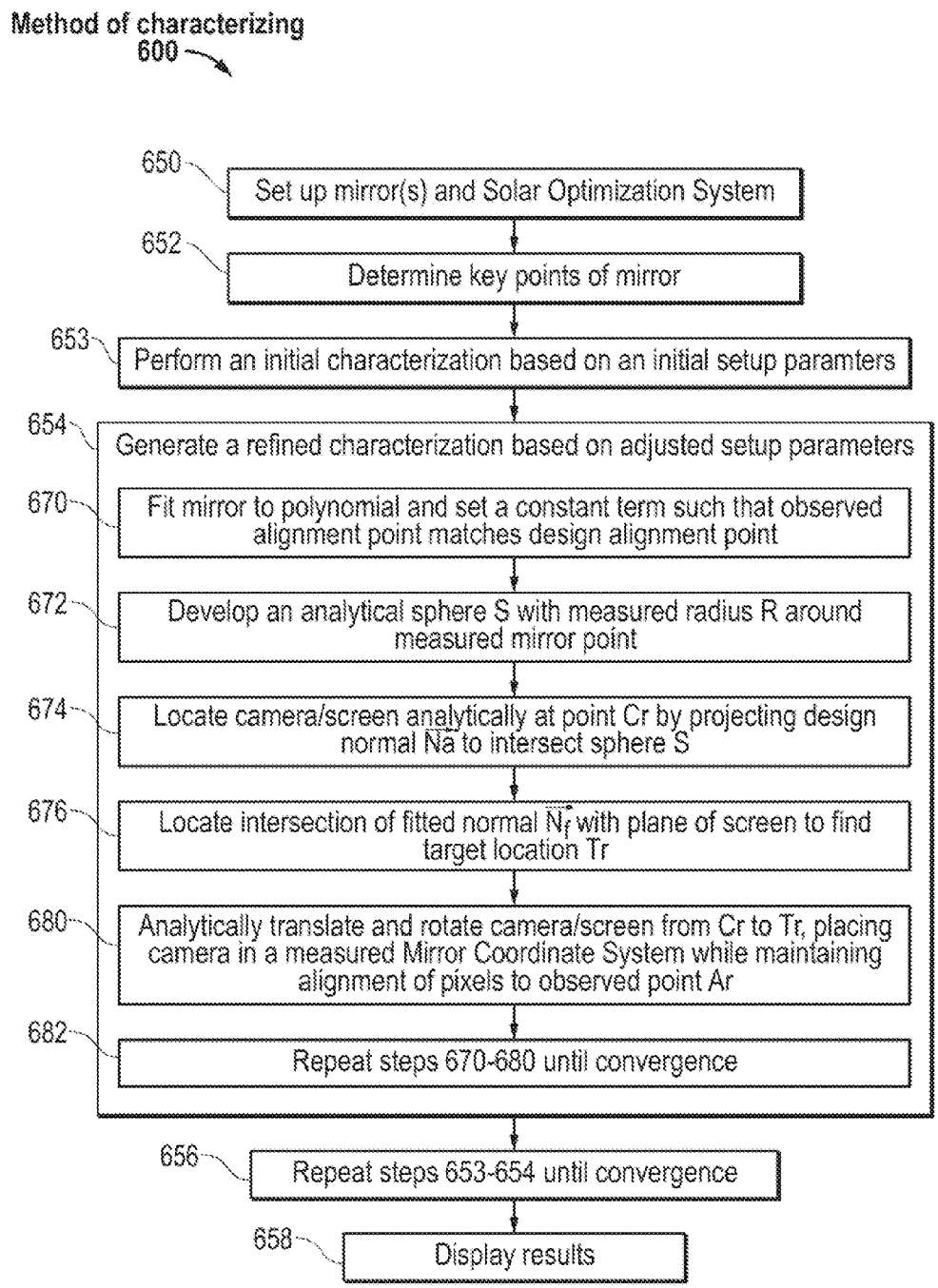
FIG. 6A is a flow chart depicting a method of characterizing at least one mirror, the method involving refinement.
Figure 6B:
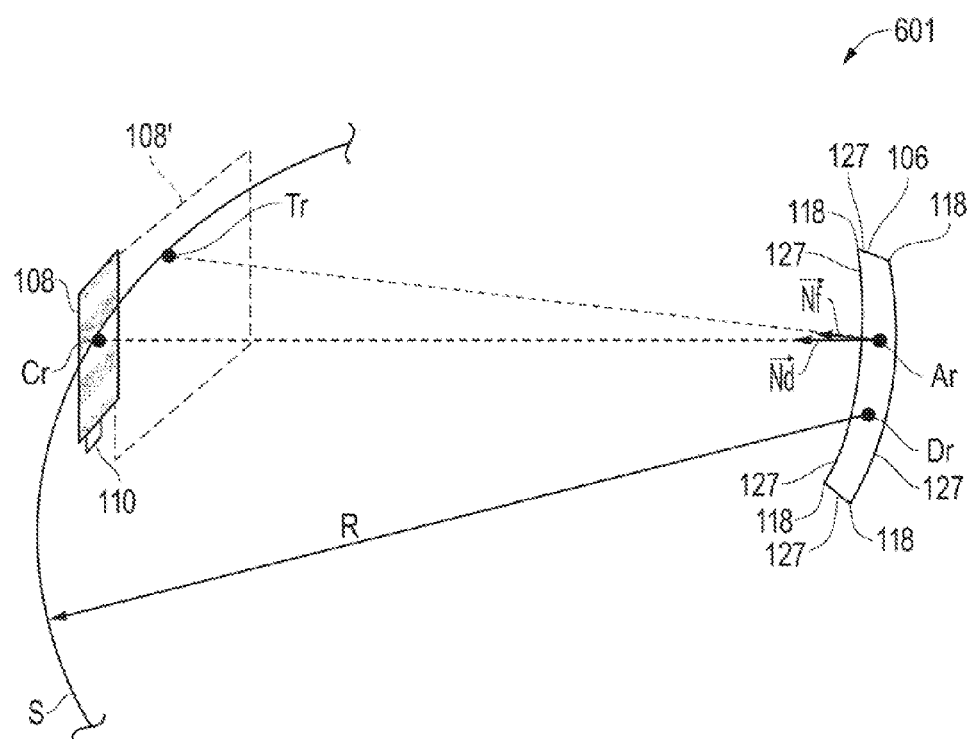
FIG. 6B is a schematic diagram of the method of characterizing at least one mirror, the method involving refinement.

FIGS. 6A and 6B depict a method 600 of characterizing at least one mirror, such as the mirror(s) 106 of FIGS. 1-5B. FIG. 6A is a flow chart depicting steps of the method. FIG. 6B is a schematic diagram depicting implementation of the method. The method 600 may be used, for example, to measure various parameters of the mirrors 106 and/or CSP systems described herein, including but not limited to slope error, focal length, shape errors, twist, etc. The method 600 may also determine various other information about the solar optimization system and/or CSP systems, such as position of the camera 110, screen 108 and/or mirror 106. Preferably, the techniques provided herein optimize the characterization of the mirror(s) 106.

The method 600 involves setting up 650 the solar optimization system 601 (or, e.g., system 100 of FIG. 1) about at least one mirror 106 using, for example, the configurations of FIGS. 1-5B. The setup of the solar optimization system 601 is positioned according to initial setup parameters. This setup may involve calibrations or other checks of the system to verify proper operation. The operation of the system involves displaying light patterns for reflection by the mirror, and receiving a reflection of the light patterns from the mirror.

Once the solar optimization system is in position about the mirror 106, key points of the mirror 106, such as corner points 118 and edges 127 therebetween, may be determined 652. These key points may be used to generate a mask depiction (e.g., 220a) as shown, for example, in FIG. 2A. This image masking process may be used to locate the key points of the mirror, such as the edges 127, corners 118 or other key features, and define an outline for the mirror. In some cases, it may be useful to cycle lighting and the screen to light and dark images, preferably in all black or white, capturing the reflected images with the camera 110, for the purpose of defining key mirror locations. It may also be useful to difference the image to create a mask of active pixels, preferably of the entire CSP system or of the single mirror 106 being characterized. The key feature location 652 may be performed for each mirror in the CSP system using conventional edge finding and feature finding algorithms applied to the mask generated or to individual images.

An initial or fringe characterization 653 may also be performed using a Characterization Technique, such as the SOFAST technique. The initial characterization 653 may use initial setup parameters, such as the points Pxyz, Cxyz, Fxyz, Txyz and vectors $\overline{TF}$, $\overline{CF}$ and $\overline{N}$ as shown in FIG. 1. By repeating this process (or processing in a parallel manner) and determining these parameters over the entire mirror 106, the shape of the mirror 106 may be determined on convergence of the calculations. The initial characterization 653 may be performed in conjunction with the key point determination step 652. During characterization, depiction 220b of the mirror 106 may be provided as shown in FIG. 2B.

In an example using the SOFAST technique to perform an initial characterization, the grayscale fringe patterns 116 are displayed on the screen 108. The setup is preferably calibrated, and the edges 127 of the mirror 106 may be defined to provide the mask depiction 220a as shown in FIG. 2A. The edges, corners, and other key features thus determined may be used to perform a photogrammetric analysis to approximately locate the camera 110 and screen 108 in the Mirror Coordinate System. Data is then collected and then reduced to provide the depiction or initial characterization 220b as shown in FIG. 2B. The image may use color and/or vectors to depict error of the depiction 220b from the designed mirror shape. The depiction 220b is a characterization of the mirror 106 that may be generated using the characterizing unit 119 of the characterizing 1001 102 of FIG. 1.

Data may be reduced by using assumed coordinates of the solar optimization system 601. A design mirror model is also supplied for the mirror 106. A measured mirror model is based (at least in part) on a fitted polynomial or parabolic equation, such as the following:

$$z=Ax^2+By^2+Cxy+Dx+Ey+F \qquad \text{Equation (1)}$$

where each of the variables of the fitted polynomial are constant terms based on data generated from the measured shape of the mirror. In a given example, x, y, z are Cartesian coordinates; A,B are the ¼f in each direction (f is the focal length of the mirror); C is the rotation of the astigmatism of the mirror; D,E are tilt of the mirror; and F is the position of the mirror. When the mirror is not a complete shape of rotation (parabola of rotation in this case), but a 'slice' of such, term C can also be interpreted as the progressive twist of the mirror. Other fitting equations may be used to characterize the measured data, and the method is not limited to parabolic mirrors and assemblies.

By using the geometry determined by the solar optimization system, surface slope(s) at each point on the mirror 106 may be determined. The calculations may be repeated until convergence is achieved. Output provided by the calculations and analysis may be, for example, models of the mirror shape and slopes, the measured surface normal at each pixel, residual slope errors, among others. These outputs may be further analyzed to provide, for example, the depiction 220b of FIG. 2B.

The initial characterization may be refined 654 to generate a refined mirror depiction 220c as shown in FIG. 2C. As shown in FIG. 6B, the mirror 106 is positioned a distance (preferably 2f) from the camera 110 and screen 108. Refinement may involve repeating the steps used in the initial characterization with new assumptions. For example, the setup parameters or assumed location of one or more of the points Pxyz, Cxyz, Fxyz and/or vectors $\overline{TF}$, $\overline{CF}$ and $\overline{N}$ as shown in FIG. 1 may be adjusted.

Refinement based on new assumptions (e.g., adjusted setup parameters) may be performed by defining points in the Mirror Coordinate System, as shown in FIG. 6B. A point Cr is defined as the combined camera 110+screen 108 position (i.e., camera/screen position Cr). By analysis, an adjusted camera/screen position 108' is defined at a point Tr. The refined mirror depiction 220c may be a refined mirror shape and orientation generated by calculating the adjusted camera/screen position Tr. This refinement is an analytical refinement involving the alignment of a single alignment point Ar on the fitted mirror shape to the design mirror shape. Distance (radius) R may be determined, for example, by careful measurement (e.g., by laser distance finder, tape measure, or other means) from point Dr at the center of the mirror. In some cases, Ar and Dr may be the same point.

Refinement may also involve alignment of an average surface normal, a weighted average surface normal or other approaches. As shown in FIG. 6B, $\overline{N_d}$ is a design surface normal at point Ar. $\overline{N_f}$ is a fitted curve surface normal at point Ar that may be calculated using various methods, such as average normal vector (e.g., by an average of all the normals on the mirror), or a weighted average (e.g., normal vectors toward the outer edge may be considered 'more important,' and thus a higher weighting value) $\overline{N_f}$ may also be calculated using a baseline method involving putting the location of Ar into the derivatives of Equation 1 (the fitted polynomial equation above), or by a fitting function used to generate a single normal at point Ar that represents the whole mirror 106. Preferably, the selected refinement technique involves aligning the camera/screen position Cr analytically based on acquired slope data, thereby aligning the mirror 106 to an apparent coordinate system, such as the Mirror Coordinate System, for further analysis with, for example, a ray tracing or other optical analysis code.

The refinement process 654 may involve fitting 670 the mirror 106 to the polynomial (Equation 1 above). Preferably, the constant terms of the polynomial are set such that the observed alignment point Ar matches the corresponding design alignment point Dr. This point may be a key point (for example, inner mirror mount location, or a line between pieces of glass on the mirror assembly) that matches a position of the design mirror.

An analytical sphere S may be developed 672 around the measured mirror point Dr having a measured radius R to the camera/screen assembly. The radius of this sphere is preferably equal to R. The camera/screen position may then be located 674 analytically at point Cr by, for example, projecting a design normal vector $\overline{N_d}$ to intersect the sphere S. Initial camera rotations may be defined by extrinsic (photogrammetric) analysis. The intersection of the fitted normal $\overline{N_f}$ with the plane of the screen (extended as needed beyond the physical extent of the screen) may be located 676 to find a target location Tr.

The camera/screen position Cr may be analytically translated and rotated 680 from Cr to Tr, thereby placing the camera/screen in a measured Mirror Coordinate System, preferably while maintaining alignment of pixels observed at point Ar. A vector $\overline{N_f}$ that represents a measured tilt of the mirror may be calculated in the Mirror Coordinate System. This calculation may involve, for example, calculating the normal vector of the fitted curve at a key location, calculating an averaged normal vector, calculating a weighted average normal vector, and/or other methods for determining a representative vector based on measured data. The intersection of the fitted normal $\overline{N_f}$ with a target plane may also be calculated 678. This becomes the measured location of the camera/screen Tr. This position may also be rotated from $\overline{N_d}$ to $\overline{N_f}$, and the position translated from design location Ar to target location Tr.

Steps of the refinement process 654 may be selectively repeated 682 until acceptable convergence is achieved. With the new geometry provided by the refinement, the characterization 653 and refinement 654 steps may be repeated in combination until convergence is reached 656. The results may then be displayed 658 as shown, for example, as the depiction or refined characterization 220c of FIG. 2C. This process results in the measured slope error being near zero at or near the selected alignment point Ar as depicted in FIG. 2C. The data generated during the method may also be used for further analysis and/or generating reports.

Figure 7A:
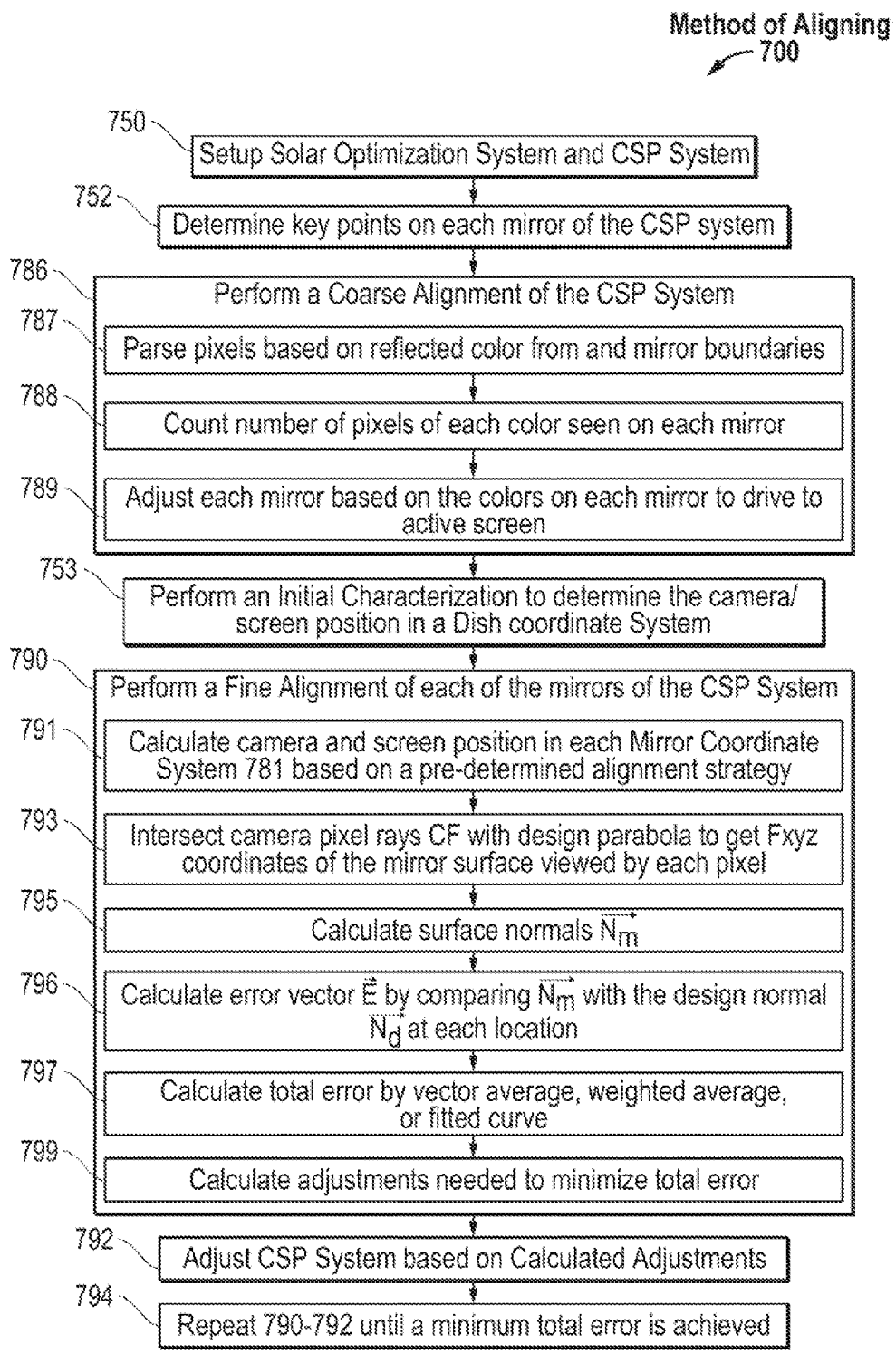
FIG. 7A is a flow chart depicting a method of aligning a CSP system.
Figure 7B:
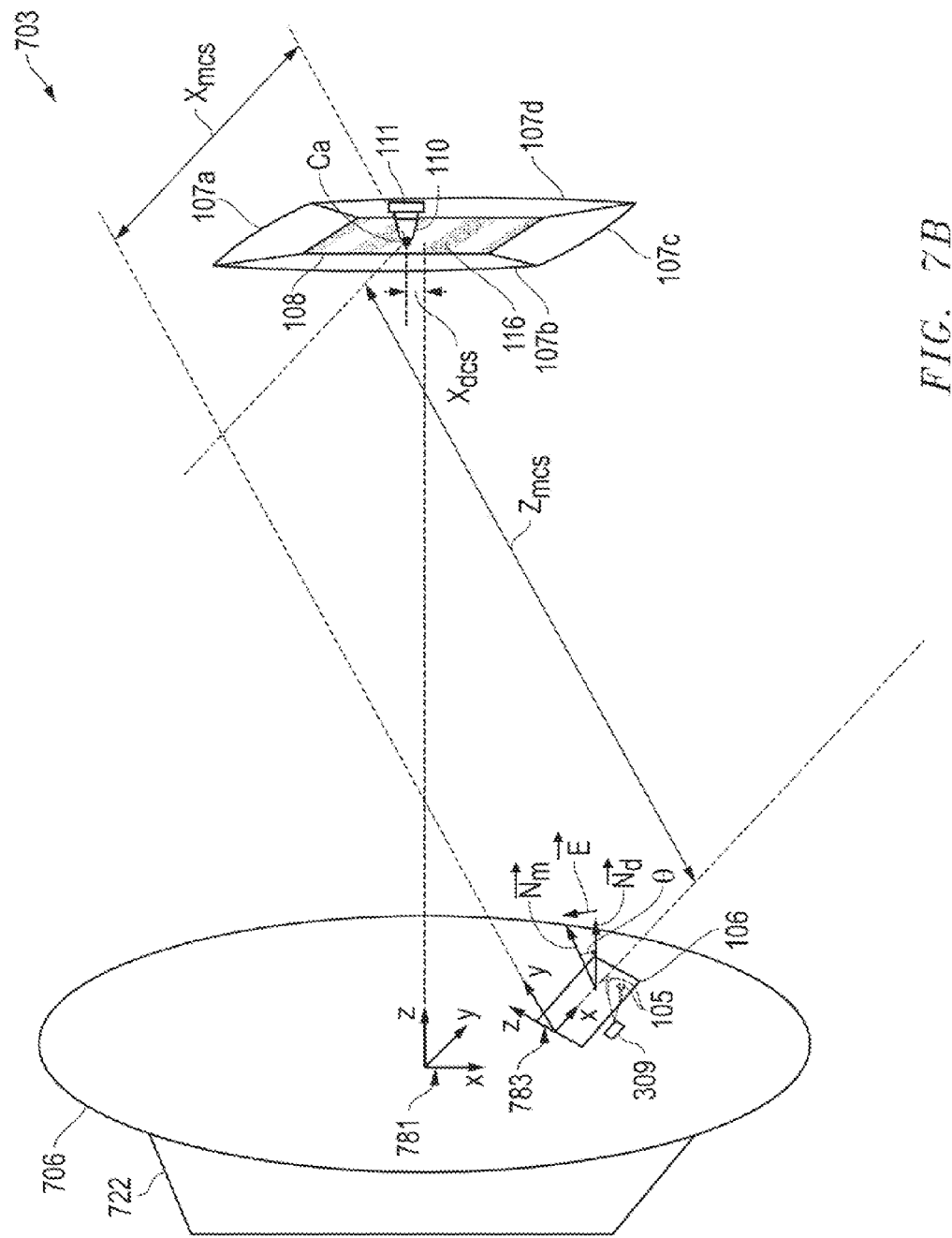
FIG. 7B is a schematic diagram of the method of aligning the CSP system.

FIGS. 7A and 7B depict a method 700 of aligning a CSP system 706 (which may be the same as the CSP systems 306, 406, 506 of FIGS. 3A-5B). FIG. 7A is a flow chart depicting steps of the method. FIG. 7B is a schematic diagram depicting implementation of the method. With this method 700, the CSP system 706 and/or its mirrors 106 are preferably positioned for optimum performance. The solar characterization tool 102 is preferably capable of characterizing and/or aligning one or more mirrors 106 in the CSP system 706 to reduce errors, such as alignment or tilt error(s) in the mirror(s) 106 that may affect the performance of the CSP system 706. Preferentially this alignment is performed just after or during the manufacturing or assembly of the CSP system. In some cases, it may be necessary to adjust, re-arrange, repair and/or replace one or more mirrors 106 in the CPS system 706, and re-align the repaired CPS system.

The method 700 may involve setting up 750 the solar optimization system 703 about the CSP system 706. The same setup used in the setup 602 for method 600 of FIG. 6 may be used, with the addition of the alignment tool 330, as shown with, for example, the mirrors 106 of the CSP systems 306, 406, 506 of FIGS. 3A-5B. The setup views one or more mirrors 106 mounted on a CSP system 706. Preferentially, the setup views the entire CSP system at one time, in order to minimize relative alignment errors. Various tools, such as adjusters 109, 309 of FIGS. 1 and 3C, may be positioned about the CSP system 706 to permit adjustment thereto.

The key points of the mirror(s) 106 may be determined 752 in the same manner as previously described for step 652 of FIG. 6A. As shown in FIG. 7B, the image masking process 752 may be performed to locate edges 127, corners 118, and other key features of one or more mirrors. Preferably, an outline for each mirror 106 of the CSP System 706 is generated (see, e.g., 220a of FIG. 2A). In some cases, it may be useful to cycle lighting and the screen to light and dark images, preferably in all black or white, capturing the reflected images with the camera 110, for the purpose of defining key points of the mirror 106. It may also be useful to difference the image to create a mask of active pixels, preferably of the entire CSP system 706. The key feature location 752 may be performed for each mirror 106 in the CSP system 706 using conventional edge finding and feature finding algorithms.

Preferably, a coarse alignment 786 is performed to initially place the mirrors of the CSP system 706 in an operable position. This coarse alignment may be performed using the white screen 108 and colored screen portions 107a-d. The coarse alignment 786 may involve imaging the CSP system 706 by illuminating the colored portions 107a-d around the white target screen 110 to reflect color from the colored portions 107a-d. The CSP system 706 may be imaged, and then the pixels are parsed 787 based on the mirror edges 127 and corners 118 found in 752 and the color of the pixel, which is the reflected color from color portions 107*a-d* and screen 108. The number of pixels of each color and on each mirror is counted 788 to determine the general location to which the mirror reflection is pointed.

An initial adjustment may be performed by selectively adjusting 789 the mirrors according to a majority of pixel colors reflected by the mirrors. Mirrors 106 are selectively moved to reflect the active screen 108 based on the color reflections of the mirrors 106. Preferably, the coarse adjustments to the CSP system are made such that a majority of white (reflected from active screen 108) is depicted on each mirror 106 of the CSP system 706. This movement may be performed automatically by a controller (e.g., controller 332 of FIG. 3) or manually by an operator. Alternatively, sequencing of lights illuminating the various color portions 107*a-d* (or non-colored portions) and taking multiple images with camera 110, could replace the use of a color camera with a grayscale camera.

The method may further involve performing an initial characterization 753 to determine the camera/screen (110 and 108 as a unit) position Ca in a CSP Coordinate System 781. This initial characterization 753 may be the same as the initial characterization 653 of FIG. 6. In an example, the initial characterization may involve, for example, displaying white and black images on the target screen 108 to image the CSP System 706. The image may be differenced to find active pixels. Markers, such as key features on the mirror and fiducials marking key points on the structure, may establish known positions on the CSP system. An extrinsic analysis (e.g., photogrammetry) may be performed using design locations of found points to identify the camera/screen and/or to generate markers (e.g., edges 127, corner points 118, etc.) in the CSP Coordinate System 781. The camera/screen location Ca (depicted as Xcsp, but may also include Xcsp, Ycsp, Zcsp) in the CSP Coordinate System 781 may be refined or confirmed through physical measurement to supplement the photogrammetry techniques.

With the initial characterization of the mirrors in the CSP system 706 completed, a fine alignment of each of the mirrors 106 in the CSP system 706 may be performed 790. This fine alignment preferably adjusts or tilts the mirror(s) 106 and/or CSP system 706 to match a given alignment strategy. The measured geometry of the components of the solar alignment system 703 may differ from a design or ideal geometry. This difference (or alignment error) may include, for example, slope, tilt or position error of one or more mirrors. The alignment error may also include, for example, differences between the measured and design positions of various components of the solar optimization system 703.

The fine alignment may involve, for example, calculating 791*a* camera/screen position Ca (depicted as Xmcs, but may also include Xmcs, Ymcs, and Zmcs) in the individual Mirror Coordinate Systems 783 based on the pre-determined alignment strategy, intersecting 793 camera pixel rays $\overline{CF}$ with a design parabola to get xyz coordinates of the mirror surface viewed by each pixel, calculating 795 surface normals $\overline{N_m}$ at each pixel location, calculating 796 error vector $\overline{E}$ by comparing $\overline{N_m}$ with a design normal $\overline{N_d}$ at each pixel location, calculating total error 797 and calculating 799 adjustments needed to minimize error (see also FIG. 1). As shown in FIG. 7B, the vectors $\overline{N_m}$ and $\overline{N_d}$ extend from the mirror 106 with an angle θ therebetween.

Steps 793 and 795 may be performed, for example, using the SOFAST Technique for each mirror 106. The calculating 799 may involve refining the surface shape based on fit and iterating until convergence is achieved. The steps 796 and 797 may be reversed in sequence in some embodiments, such that a representative single vector is determined first, and this single vector is compared to design to determine alignment error, rather than summing individual errors.

Total alignment error may be determined for each mirror using an error method, such as vector average error across the mirror, weighted average error across the mirror, fitted curve or normal at specific alignment point or other conventional fitting techniques. Once the measured geometry, positions, and rotations of the mirrors and structures are calculated, they may be compared with the design geometry to generate the alignment error. One or more of the mirrors 106 of the CSP system 706 may be adjusted 792 based on the calculated adjustments. The fine alignment process may be repeated 794 until the alignment error is optimized (or reduced to a desired level).

Once the desired alignment strategy is achieved, one or more mirrors may be locked into a final position, and any alignment tools removed. In cases where alignment is performed in the field, the solar optimization system may be removed and relocated to another CSP system for optimization thereof. In cases where the CSP system has a tower 509, the solar optimization system may be positioned about one or more heliostats 507 to provide optimization to the entire system as in FIG. 5B. Alternatively, the optimization system may be assembled to the tower 509 and used to selectively align one or more heliostats 507 in the field as in FIG. 5A. In cases where alignment is performed in a facility, the CSP system may be transported from the facility and to the field for usage as shown in FIGS. 3C and 5*b*. FIGS. 3A, 3B, and 3C show that a similar alignment may be performed in a facility or in the field. Similar variations can be used in the case of towers and trough CSP systems, examples of which are displayed in FIGS. 4 and 5, but such examples are not an exhaustive list of variations.

The method as described in FIGS. 7A and 7B uses an alignment strategy implemented by placing the camera 110 into the aligned Mirror Coordinate System 783 based on the given strategy, and then working out the mirror tilt errors within the Mirror Coordinate System 783. Alternatively, the 'design' condition could also be designated in the CSP Coordinate System 781, or any convenient coordinate system, and the error calculated and implemented with the CSP Coordinate System 781 or convenient coordinate system. Other techniques may be employed that use the characterization of all mirrors on the CSP System to implement an alignment of the CSP system.

While the optimization methods described with respect to FIGS. 6 and 7 may disclose methods using specific geometry in specific coordinate systems, such as a Mirror Coordinate System 783 and a CSP Coordinate System 781, it will be appreciated that the measured and design surface shape and normals may be placed into any convenient coordinate system for comparison purposes. Analytically placing the camera/screen position into a Mirror Coordinate System 783 of an aligned mirror may be a convenient approach.

The solar optimization methods 600 and 700 may be used with any measurable mirror and/or reflective system, such as those depicted. Controllers, adjusters and/or other conventional tools, such as those described herein, may be used in connection with the solar optimization systems, mirrors and/or CSP systems to make desired adjustments and/or movements in response to commands generated and/or results determined by the solar optimization systems.

The solar characterization and alignment tools may take the form of an entirely hardware embodiment, an entirely software embodiment (including firmware, resident software, micro-code, etc.) or an embodiment combining software and hardware aspects. Embodiments may take the form of a computer program embodied in any medium having computer usable program code embodied in the medium. The embodiments may be provided as a computer program product, or software, that may include a machine-readable medium having stored thereon instructions, which may be used to program a computer system (or other electronic device(s)) to perform a process.

A machine readable medium includes any mechanism for storing or transmitting information in a form (such as, software, processing application) readable by a machine (such as a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Embodiments may further be embodied in an electrical, optical, acoustical or other form of propagated signal (e.g., carrier waves, infrared signals, digital signals, etc.), or wireline, wireless, or other communications medium. Further, it should be appreciated that the embodiments may take the form of hand calculations, and/or operator comparisons. To this end, the operator and/or engineer(s) may receive, manipulate, catalog and store the data from the systems, tools and/or units in order to perform tasks depicted in the solar optimization systems described herein.

It will be understood from the foregoing description that various modifications and changes may be made in the preferred and alternative embodiments of the present invention without departing from its true spirit. For example, the solar optimization tools described herein may have one or more solar characterization, alignment and/or other systems in separate or unitary configurations.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An optimization system for at least one mirror of at least one CSP system, the system comprising:
   a screen for displaying light patterns for reflection by the at least one mirror;
   a camera for receiving a reflection of the light patterns from the at least one mirror;
   a solar characterization tool comprising a characterizing unit for determining at least one mirror parameter of the at least one mirror based on an initial position of the camera and the screen, and a refinement unit for refining the determined at least one mirror parameter had on an analytically adjusted position of the camera and screen whereby the at least one mirror is characterized; and
   a pivot, the screen having a plurality of sides positionable via the pivot.

2. The system of claim 1, further comprising a display for displaying a depiction of the at least one mirror generated by the solar characterization tool.

3. The system of claim 1, wherein the solar characterization tool further comprises a database.

4. The system of claim 1, wherein the solar characterization tool further comprises a transceiver.

5. The system of claim 1, further comprising a solar alignment tool for comparing the at least one mirror parameter of the at least one mirror to a design geometry whereby art alignment error is defined, and at least one alignment unit for adjusting the at least one mirror to reduce the alignment error.

6. An optimization system for at least one mirror of at least one CSP system, the system comprising:
   a screen for displaying light patterns for reflection by the at least one mirror;
   a camera for receiving a reflection of the light patterns from the at least one mirror;
   a solar characterization tool comprising a characterizing unit for determining at least one mirror parameter of the at least one mirror based on at least one initial setup parameter in a CSP Coordinate System whereby the at least one mirror is characterized;
   a solar alignment tool comprising an alignment unit for comparing at least one mirror parameter of the at least one mirror to a design geometry whereby an alignment error is defined, and at least one adjuster for adjusting the at least one mirror to reduce the alignment error; and
   a pivot, the screen having a plurality of sides positionabie via the pivot.

7. The system of claim 6, wherein the solar alignment unit comprises a controller.

8. The system of claim 6, wherein the solar alignment unit comprises a database.

9. The system of claim 6, wherein the solar alignment unit comprises a transceiver.

10. The system of claim 6, wherein the adjuster is activatable by the at least one alignment unit for selectively positioning one selected from the group of the mirror, screen, camera and combinations thereof.

11. The system of claim 6, further comprising at least one colored portion extending from the screen.

12. The system of claim 6, further comprising at least one lighted panel portion extending from the screen.

13. The system of claim 6, further comprising a mobile platform for supporting one selected from the group of the at least one mirror, screen, camera and combinations thereof.

14. The system of claim 6, further comprising a shed with a mount for supporting the screen and the camera.

15. A method for optimization for at least one mirror of a CSP system, the method comprising:
   portioning an optimization system about out the at least one mirror according to initial setup parameters;
   activating the optimization system to display light patterns for reflection by the at least one mirror and receive a reflection of the light patterns from the at least one mirror;
   generating an initial characterization of the at least one mirror based on an initial camera/screen position, wherein the step of generating an initial characterization is performed using the SOFAST Technique; and
   generating a refined characterization based on an analytically adjusted camera/screen position.

16. The method of claim 15, further comprising generating a mask of the at least one mirror by determining key points on the at least one mirror.

17. The method of claim 15, further comprising displaying a depiction of the at, least one mirror generated by a solar characterization unit.

18. The method of claim 17, wherein in the step of generating as refilled characterization comprises:

fitting the at least one mirror to a polynomial defining a shape of the at least one mirror;

developing an analytical sphere with a measured radius around a measured mirror point;

locating the adjusted camera/screen position analytically at an alignment point by projecting a design normal of the at least one mirror to intersect the sphere;

locating an intersection of a fitted normal of the at least one mirror with a plane of the screen to find a target location; and analytically translating and rotating the initial camera/screen position to the adjusted camera/screen position by placing the camera in a measured Mirror Coordinate System while maintaining alignment of pixels to the observed alignment point.

19. The method of claim 15, wherein the adjusted camera position is determined by analytically repositioning the camera/screen position based on a measured Mirror Coordinate System.

20. The method of claim 19, wherein the Mirror Coordinate System is defined by a normal vector defined at a single point on the at least one mirror by a fitted equation of the at least one mirror.

21. The method of claim 19, wherein the Mirror Coordinate System is defined by a normal vector determined by an analytical average or other combination of field of normal vectors measured on the at least one mirror.

22. The method of claim 21, wherein the alignment point is an imaginary position of the Mirror Coordinate System.

23. The method of claim 15, wherein a polynomial term of a polynomial defining a shape of the at least one mirror represents rotation of an astigmatism interpreted as twist of the at least one mirror.

24. The method of claim 15, wherein the at least one mirror has an alignment point thereon representing the whole mirror.

25. A method for optimization for at least one mirror of a CSP system, the method comprising:

positioning an optimization system about the at least one mirror according to initial setup parameters;

activating the optimization system to display light patterns for reflection by the at least one mirror and receive a reflection of the light patterns from the at least one mirror;

generating an initial characterization of the at least one mirror of the at least one mirror based on an initial position of a camera and a screen; and aligning the at least one mirror of the CSP System by defining an alignment error based on a comparison of at least one mirror parameter of the at least one mirror to a design geometry, and adjusting the at least one mirror to reduce the alignment error, wherein the step of aligning the at least one mirror comprises:

calculating an adjusted position of the camera and the screen in a Mirror Coordinate System for each at least one mirror based on a pre-determined alignment strategy;

intersects camera pixel rays with at design parabola to obtain coordinates of the at least one mirror;

calculating at least one surface normal of the at least one mirror;

calculating at least one error vector by comparing the surface normal with a design normal for each of the at least one mirrors;

calculating a total error based on curve fitting of the calculated at least one error vector; and calculating adjustments to the at least one mirror to minimize the total error.

26. The method of claim 25, further comprising performing a coarse alignment by adjusting each of the at least one mirror based on a color reflection in each of the at least one mirrors from a target screen having a plurality of color portions extending therefrom.

27. The method of claim 25, wherein the step of performing a fine alignment comprises characterization of mirror rotations using pattern reflection.

28. The method of claim 25, further comprising performing a coarse alignment by adjusting each of the at least one mirror based on a controlled lighted panel reflection in each of the at least one mirrors from a target screen having a plurality of controlled lighted panel portions extending therefrom.

29. The method of claim 25, wherein the step of performing a fine alignment comprises determination of individual mirror alignment error through averaging of a measured normal vector error across each mirror.

30. The method of claim 25, wherein the step of performing a fine alignment comprises determination of individual mirror alignment error through weighted averaging of measured normal vector error across each mirror.

31. The method of claim 25, wherein the step of performing fine alignment comprises determination of individual mirror alignment error through a representative vector determined through a fitted mirror shape equation.

32. The method of claim 31, wherein the fitted mirror shape equation comprises $z=Ax^2+By^2+Cxy+Dx+Ey+F$.

33. The method of claim 25, wherein the step of performing a fine alignment comprises automated adjustment of the at least one mirror with an actuator using real-time feedback from a characterization system to the actuator.

34. The method of claim 33, wherein the actuators are manually installed and removed.

35. The method of claim 25, wherein the step of performing a line alignment comprises manual adjustment of each of the at least one mirrors using real-time feedback from an alignment tool to at least one person performing the alignment.

36. The method of claim 25, further comprising defining at least one key feature of the at least one mirror by performing an image masking process.

37. The method of claim 25, further comprising performing photogrammetric determination of relative locations of at least one key point about the at least one mirror.

* * * * *